(No Model.) J. J. FIELDS, Jr. 2 Sheets—Sheet 1.
METHOD OF AND APPARATUS FOR MANUFACTURING SEAMLESS RUBBER TUBING.
No. 580,854. Patented Apr. 20, 1897.
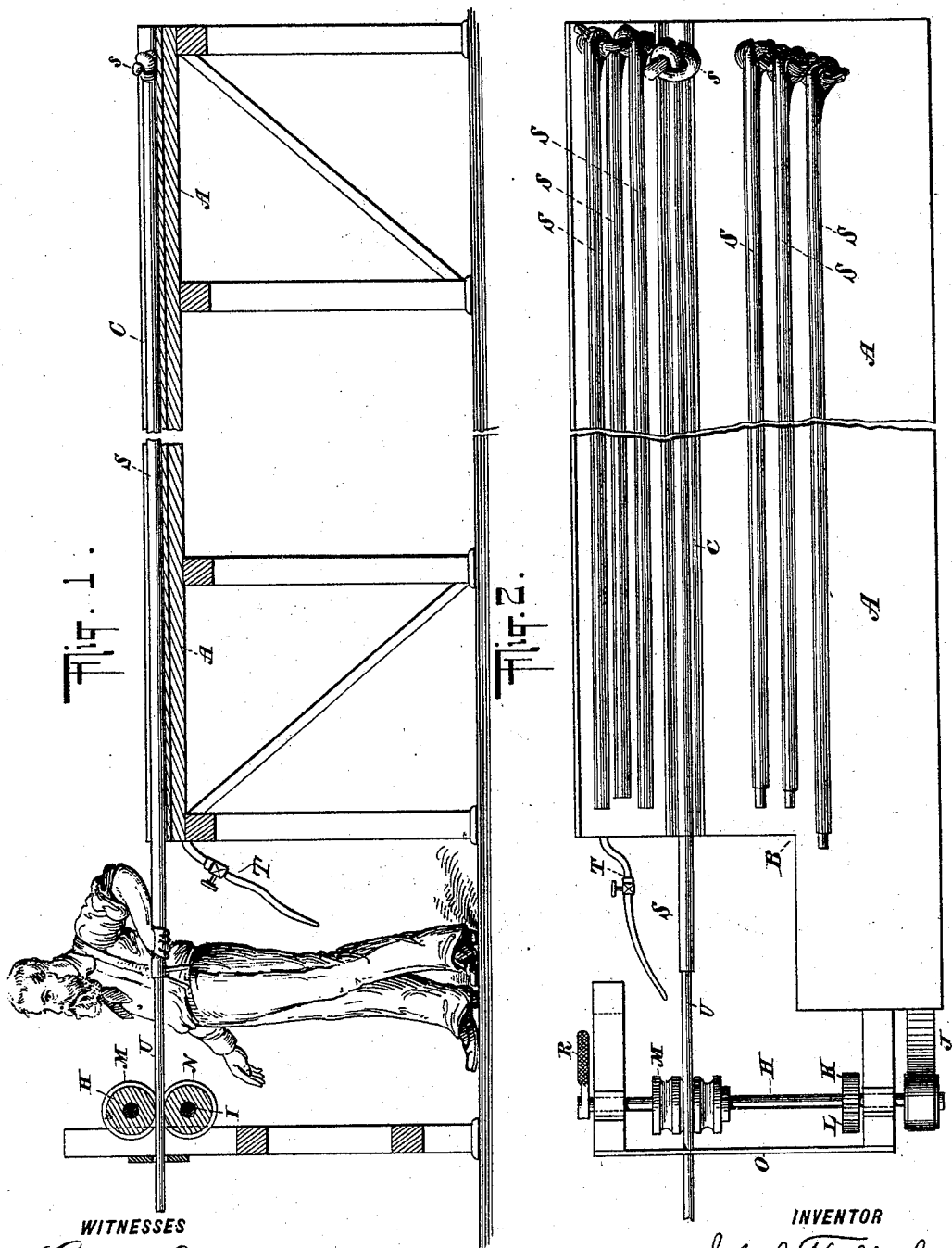
WITNESSES
INVENTOR
John J. Fields, Jr.
BY Briesen & Knauth
ATTORNEYS.

(No Model.) J. J. FIELDS, Jr. 2 Sheets—Sheet 2.
METHOD OF AND APPARATUS FOR MANUFACTURING SEAMLESS RUBBER TUBING.
No. 580,854. Patented Apr. 20, 1897.
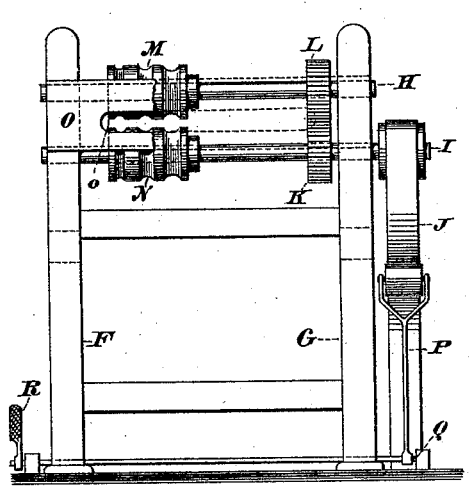
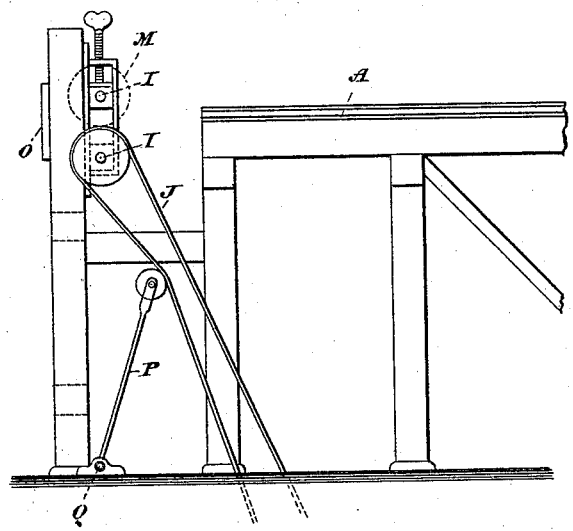
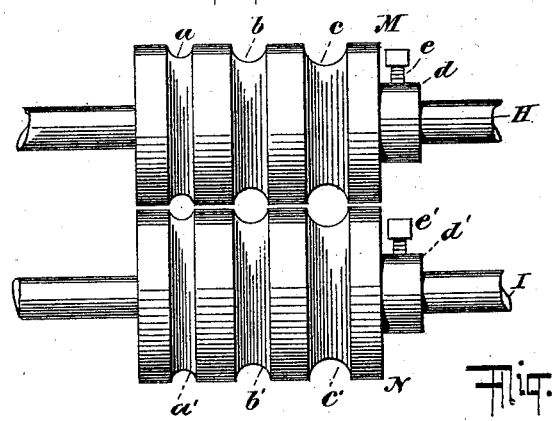
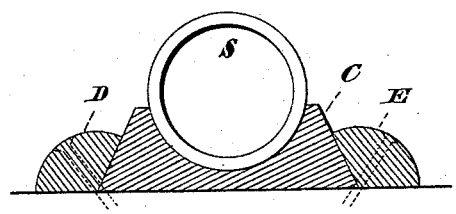
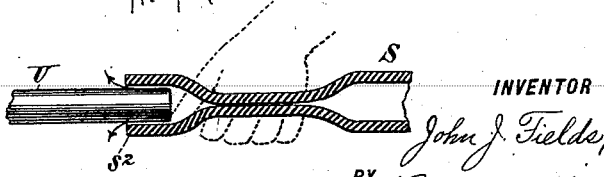
WITNESSES
INVENTOR
John J. Fields, Jr.
BY Briesen & Knauth
ATTORNEYS.

UNITED STATES PATENT OFFICE.

JOHN J. FIELDS, JR., OF BROOKLYN, NEW YORK, ASSIGNOR TO THE NEW JERSEY CAR SPRING AND RUBBER COMPANY, OF JERSEY CITY, NEW JERSEY.

METHOD OF AND APPARATUS FOR MANUFACTURING SEAMLESS RUBBER TUBING.

SPECIFICATION forming part of Letters Patent No. 580,854, dated April 20, 1897.

Application filed January 16, 1897. Serial No. 619,401. (No model.)

*To all whom it may concern:*

Be it known that I, JOHN J. FIELDS, Jr., a resident of the city of Brooklyn, county of Kings, and State of New York, have invented certain new and useful Improvements in Methods of and Apparatus for Manufacturing Seamless Rubber Tubing, of which the following is a specification.

My invention relates to a method of and apparatus for manufacturing seamless rubber tubing, and has special reference to curing seamless green-rubber tubing either covered or uncovered.

It is well known that seamless rubber tubing possesses greater strength than rubber tubing having a seam, which seam is liable to be imperfectly sealed, so as to be a source of weakness to the tube. On the other hand, great difficulty has heretofore been experienced in curing green seamless tubing, and it is these difficulties that I propose by my present invention to obviate.

My invention will be understood by referring to the accompanying drawings, forming part hereof, in which—

Figure 1 is a sectional elevation of an apparatus for carrying out my invention. Fig. 2 is a plan view of the apparatus shown in Fig. 1. Fig. 3 is an end view of the said apparatus. Fig. 4 is a partial side elevation of the apparatus, showing the rolls for feeding the mandrel and their driving mechanism. Fig. 5 is an enlarged detail view of the rolls for feeding the mandrel. Fig. 6 is an enlarged sectional view of the pipe-carrying trough or pillow-block; and Fig. 7 is an exaggerated detail sectional view of the end of the tube, showing the method of inserting the mandrel into the tube.

In the drawings, A is a tube-carrying table which may be provided with a reëntrant angle B. Mounted upon the table is a grooved pillow-block or trough C, which is shown as removably held thereto by strips D E, properly secured to the table, so that pillow-blocks having grooves of different sizes may be used interchangeably. It is in this trough or pillow-block that the tube to be operated upon is laid and in which it is held perfectly straight. Mounted in front of the table are suitable standards F and G, which carry shafts H and I, the shaft I being suitably driven, as by a belt J, and being provided with a gearing K, which meshes with a gearing L on the shaft H, so that the shaft H will be driven from the shaft I at the same rate of speed at which the shaft I is driven by the belt J. Carried on the shaft H is a grooved roll M, provided with grooves $a$ $b$ $c$ of different depths and a collar $d$ and set-screw $e$, by which the roll may be adjusted longitudinally on the shaft H. The shaft I is provided with a roll N, which is provided with a groove $a'$, a groove $b'$, and a groove $c'$, similar in size and shape to the grooves $a$, $b$, and $c$, and a collar $d'$ and set-screw $e'$, whereby this roll N may be adjusted along the shaft I. The rolls M and N are feeding-rollers for the mandrel, being able to feed mandrels of different sizes by reason of the different-sized grooves.

O is a slotted guard or shield to prevent operatives from getting their fingers caught between the rolls where the mandrel enters between the said rolls, the mandrel passing to the said rolls M N through the slot $o$ in the guard O.

The rolls may be set in motion by tightening the belt J by means of a belt-tightener P, mounted on the rock-shaft Q, which is worked by the foot-piece R.

The mode of using the above-mentioned apparatus for carrying out my process is as follows: Seamless rubber tubes S are brought green from the tube-forming mechanism and placed upon the table A, one of the said tubes being placed in the pillow-block or trough C and has one of its ends $s$ closed, as by being knotted. The green tube is now inflated by means of an air-tube T, and when fully inflated is pinched, as by the hand of the operator, at or near the end $s^2$ or otherwise, (see Fig. 7,) and the end of the mandrel U then inserted. The hand is then relaxed and the mandrel allowed to be fed by the rollers M N. As the rolls revolve the mandrel will be forced into the tube, the operator holding the green tube tight, so that it will not move lengthwise while the mandrel enters it. The air escapes from within the tube around the advancing mandrel and forms a film around the mandrel, allowing the mandrel to readily enter the tube, thereby decreasing the friction, which would otherwise be a considerable item. When the mandrel has been fed fully into the tube, the tube, with the mandrel inside it, is removed and another put in its place and the operation repeated. The tubes having the mandrels in them are vulcanized in suitable manner.

It will be clearly apparent that by holding the tube stationary, either in the manner shown or otherwise, and in line with the entering mandrel, either in the manner shown or otherwise, and providing for the escape of air from the tube around the mandrel there will be no danger of puckering or wrinkling the walls of the green tube so as to produce inequalities therein, as is the case where it is attempted to successfully feed a green tube upon a stationary mandrel.

What I claim, and desire to secure by Letters Patent, is—

1. The herein-described method of making seamless rubber tubing, which consists in forming a seamless green-rubber tube, in thereupon inflating the said tube, in then feeding a mandrel into the said inflated tube while the said tube is stationary and allowing the air in the tube to escape around the mandrel and thereupon curing the said tube while on the mandrel.

2. An apparatus for forming seamless rubber tubing comprising a tube-receiving table A, means substantially as described for supporting said tubing straight and stationary on said table, an air-tube T, a mandrel and means substantially as described for feeding said mandrel into the tube while the latter is held stationary in line with and toward said tube-support, substantially as described.

JOHN J. FIELDS, JR.

Witnesses:
GEO. E. MORSE,
HARRY M. TURK.